(12) United States Patent
Imes et al.

(10) Patent No.: US 10,135,628 B2
(45) Date of Patent: Nov. 20, 2018

(54) SYSTEM, DEVICE, AND APPARATUS FOR COORDINATING ENVIRONMENTS USING NETWORK DEVICES AND REMOTE SENSORY INFORMATION

(71) Applicant: Samsung Electronics Co., Ltd., Suwon-si, Gyeonggi-do (KR)

(72) Inventors: Kevin R. Imes, Austin, TX (US); James Hollister, Round Rock, TX (US); John Cottrell, Austin, TX (US)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 670 days.

(21) Appl. No.: 14/590,918

(22) Filed: Jan. 6, 2015

(65) Prior Publication Data

US 2015/0195099 A1    Jul. 9, 2015

Related U.S. Application Data

(60) Provisional application No. 61/924,048, filed on Jan. 6, 2014.

(51) Int. Cl.
*G08G 1/07*       (2006.01)
*H04L 12/28*      (2006.01)
(Continued)

(52) U.S. Cl.
CPC .......... *H04L 12/2803* (2013.01); *G05B 15/02* (2013.01); *H04L 12/2827* (2013.01);
(Continued)

(58) Field of Classification Search
CPC .. H04L 67/42; H04L 12/2803; F24F 11/0034; G08B 13/06; G08B 13/22;
(Continued)

(56) References Cited

U.S. PATENT DOCUMENTS 1,568,584 A    1/1926  Blankenship
2,042,633 A    6/1936  Richardson
(Continued)

FOREIGN PATENT DOCUMENTS

EP    1814260 A2    8/2007
JP    H0879840 A    3/1996
(Continued)

OTHER PUBLICATIONS

International Search Report, dated Apr. 30, 2015, 4 pages.
(Continued)

*Primary Examiner* — Firmin Backer
*Assistant Examiner* — Munear Akki
(74) *Attorney, Agent, or Firm* — Staas & Halsey LLP (57) ABSTRACT

According to an aspect of the disclosure, a system, device and apparatus for coordinating environments using networked devises and remote sensory based information is provided. The system can include an intelligent remote sensor configured to communicate sensory-based information to a network device and a mobile device. The system also includes an environment coordinator configured to communicate with the intelligent remote sensor to initiate coordinating operating conditions of the network device at a site.

13 Claims, 4 Drawing Sheets

(51) Int. Cl.
*H04W 4/80* (2018.01)
*G05B 15/02* (2006.01)
*H04L 29/08* (2006.01)

(52) U.S. Cl.
CPC ............ *H04L 67/125* (2013.01); *H04W 4/80* (2018.02); *G05B 2219/2642* (2013.01); *H04L 2012/2841* (2013.01)

(58) Field of Classification Search
CPC ...... G08B 21/22; G08B 27/005; H04N 7/183; H04W 4/008; H04W 60/00
USPC .................... 340/3.1, 501, 632, 539.22, 541; 455/426.1, 41.1, 435.1
See application file for complete search history.

(56) References Cited

U.S. PATENT DOCUMENTS

| | | | |
|---|---|---|---|
| 2,427,965 A | 9/1947 | Henderson |
| 2,931,006 A | 3/1960 | Klumpp, Jr. |
| 2,960,677 A | 11/1960 | Stearn et al. |
| 3,194,957 A | 7/1965 | Caldwell et al. |
| 3,237,148 A | 2/1966 | Ege |
| 3,531,759 A | 9/1970 | Hansen |
| 3,675,183 A | 7/1972 | Drake |
| 3,808,602 A | 4/1974 | Hoeffel et al. |
| 4,407,447 A | 10/1983 | Sayegh |
| 4,437,716 A | 3/1984 | Cooper |
| 4,497,031 A | 1/1985 | Froehling et al. |
| 4,645,286 A | 2/1987 | Isban et al. |
| 5,127,575 A | 7/1992 | Beerbaum |
| 5,274,571 A | 12/1993 | Hesse et al. |
| 5,289,362 A | 2/1994 | Liebl et al. |
| 5,461,390 A | 10/1995 | Hoshen |
| 5,476,221 A | 12/1995 | Seymour |
| 5,537,339 A | 7/1996 | Naganuma et al. |
| 5,544,036 A | 8/1996 | Brown, Jr. et al. |
| 5,566,084 A | 10/1996 | Cmar |
| 5,595,342 A | 1/1997 | McNair et al. |
| 5,682,949 A | 11/1997 | Ratcliffe et al. |
| 5,725,148 A | 3/1998 | Hartman |
| 5,729,442 A | 3/1998 | Frantz |
| 5,764,146 A | 6/1998 | Baldwin et al. |
| 5,812,949 A | 9/1998 | Taketsugu |
| 5,819,840 A | 10/1998 | Wilson et al. |
| 5,884,072 A | 3/1999 | Rasmussen |
| 5,964,625 A | 10/1999 | Farley |
| 5,987,379 A | 11/1999 | Smith |
| 6,014,080 A | 1/2000 | Layson, Jr. |
| 6,073,019 A | 6/2000 | Lowdon |
| 6,108,614 A | 8/2000 | Lincoln et al. |
| 6,128,661 A | 10/2000 | Flanagin et al. |
| 6,175,078 B1 | 1/2001 | Bambardekar et al. |
| 6,353,180 B1 | 3/2002 | Debartolo, Jr. et al. |
| 6,400,956 B1 | 6/2002 | Richton |
| 6,442,639 B1 | 8/2002 | McElhattan |
| 6,478,233 B1 | 11/2002 | Shah |
| 6,483,028 B2 | 11/2002 | Debartolo, Jr. et al. |
| 6,553,418 B1 | 4/2003 | Collins et al. |
| 6,623,311 B1 | 9/2003 | Dehan |
| 6,636,893 B1 | 10/2003 | Fong |
| 6,684,087 B1 | 1/2004 | Yu et al. |
| 6,785,542 B1 | 8/2004 | Blight et al. |
| 6,785,630 B2 | 8/2004 | Kolk et al. |
| 6,850,252 B1 | 2/2005 | Hoffberg |
| 6,868,293 B1 | 3/2005 | Schurr et al. |
| 6,975,958 B2 | 12/2005 | Bohrer et al. |
| 6,976,366 B2 | 12/2005 | Starling et al. |
| 6,980,659 B1 | 12/2005 | Barnum |
| 6,999,757 B2 | 2/2006 | Bates et al. |
| 7,016,751 B2 | 3/2006 | Nordquist et al. |
| 7,031,945 B1 | 4/2006 | Donner |
| 7,082,460 B2 | 7/2006 | Hansen et al. |
| 7,083,109 B2 | 8/2006 | Pouchak |
| 7,099,483 B2 | 8/2006 | Inagaki |
| 7,114,554 B2 | 10/2006 | Bergman et al. |
| 7,127,328 B2 | 10/2006 | Ransom |
| 7,127,734 B1 | 10/2006 | Amit |
| 7,130,719 B2 | 10/2006 | Ehlers et al. |
| 7,139,564 B2 | 11/2006 | Hebert |
| 7,140,551 B2 | 11/2006 | De Pauw et al. |
| 7,155,305 B2 | 12/2006 | Hayes et al. |
| 7,159,789 B2 | 1/2007 | Schwendinger et al. |
| 7,188,003 B2 | 3/2007 | Ransom et al. |
| 7,197,011 B2 | 3/2007 | Fong |
| 7,216,021 B2 | 5/2007 | Matsubara et al. |
| 7,222,800 B2 | 5/2007 | Wruck |
| 7,224,966 B2 | 5/2007 | Caspi et al. |
| 7,257,397 B2 | 8/2007 | Shamoon et al. |
| 7,343,226 B2 | 3/2008 | Ehlers et al. |
| 7,349,761 B1 | 3/2008 | Cruse |
| 7,363,053 B2 | 4/2008 | Dalton et al. |
| 7,403,838 B2 | 7/2008 | Deen et al. |
| 7,444,401 B1 | 10/2008 | Keyghobad et al. |
| 7,451,017 B2 | 11/2008 | McNally |
| 7,460,827 B2 | 12/2008 | Schuster et al. |
| 7,477,617 B2 | 1/2009 | Chen et al. |
| 7,510,126 B2 | 3/2009 | Rossi et al. |
| 7,525,425 B2 | 4/2009 | Diem |
| 7,526,539 B1 | 4/2009 | Hsu |
| 7,554,437 B2 | 6/2009 | Axelsen |
| 7,565,225 B2 | 7/2009 | Dushane |
| 7,567,844 B2 | 7/2009 | Thomas et al. |
| 7,574,208 B2 | 8/2009 | Hanson et al. |
| 7,574,283 B2 | 8/2009 | Wang et al. |
| 7,590,703 B2 | 9/2009 | Cashman et al. |
| 7,644,591 B2 | 1/2010 | Singh et al. |
| 7,665,670 B2 | 2/2010 | Ahmed |
| 7,668,532 B2 | 2/2010 | Shamoon et al. |
| 7,671,544 B2 | 3/2010 | Clark et al. |
| 7,693,581 B2 | 4/2010 | Callaghan et al. |
| 7,706,928 B1 | 4/2010 | Howell et al. |
| 7,715,951 B2 | 5/2010 | Forbes et al. |
| 7,747,739 B2 | 6/2010 | Bridges et al. |
| 7,752,309 B2 | 7/2010 | Keyghobad et al. |
| 7,761,910 B2 | 7/2010 | Ransom |
| 7,775,453 B2 | 8/2010 | Hara |
| 7,783,738 B2 | 8/2010 | Keyghobad et al. |
| 7,792,946 B2 | 9/2010 | Keyghobad et al. |
| 7,798,417 B2 | 9/2010 | Snyder et al. |
| 7,812,766 B2 | 10/2010 | Leblanc et al. |
| 7,813,831 B2 | 10/2010 | McCoy et al. |
| 7,865,252 B2 | 1/2011 | Clayton |
| 7,881,816 B2 | 2/2011 | Mathiesen et al. |
| 7,884,727 B2 | 2/2011 | Tran |
| 7,886,166 B2 | 2/2011 | Schnekendorf et al. |
| 7,895,257 B2 | 2/2011 | Helal et al. |
| 7,908,019 B2 | 3/2011 | Ebrom et al. |
| 7,908,116 B2 | 3/2011 | Steinberg et al. |
| 7,908,117 B2 | 3/2011 | Steinberg et al. |
| 7,912,559 B2 | 3/2011 | McCoy et al. |
| 7,917,914 B2 | 3/2011 | McCoy et al. |
| 7,918,406 B2 | 4/2011 | Rosen |
| 7,921,429 B2 | 4/2011 | McCoy et al. |
| 7,941,530 B2 | 5/2011 | Ha et al. |
| 7,949,615 B2 | 5/2011 | Ehlers et al. |
| 7,953,518 B2 | 5/2011 | Kansal et al. |
| 7,973,707 B2 | 7/2011 | Verechtchiagine |
| 7,975,051 B2 | 7/2011 | Saint Clair et al. |
| 7,979,163 B2 | 7/2011 | Terlson et al. |
| 8,005,780 B2 | 8/2011 | McCoy et al. |
| 8,010,237 B2 | 8/2011 | Cheung et al. |
| 8,010,418 B1 | 8/2011 | Lee |
| 8,010,812 B2 | 8/2011 | Forbes, Jr. et al. |
| 8,019,445 B2 | 9/2011 | Marhoefer |
| 8,024,073 B2 | 9/2011 | Imes et al. |
| 8,028,049 B1 | 9/2011 | Ellis et al. |
| 8,028,302 B2 | 9/2011 | Glotzbach et al. |
| 8,032,233 B2 | 10/2011 | Forbes, Jr. et al. |
| 8,042,048 B2 | 10/2011 | Wilson et al. |
| 8,049,592 B2 | 11/2011 | Wang et al. |
| 8,063,775 B2 | 11/2011 | Reed et al. |
| 8,082,065 B2 | 12/2011 | Imes et al. |
| 8,090,477 B1 | 1/2012 | Steinberg |

(56) References Cited

U.S. PATENT DOCUMENTS

| | | |
|---|---|---|
| 8,091,765 B2 | 1/2012 | Jiang et al. |
| 8,091,795 B1 | 1/2012 | McLellan et al. |
| 8,099,195 B2 | 1/2012 | Imes et al. |
| 8,099,198 B2 | 1/2012 | Gurin |
| 8,108,076 B2 | 1/2012 | Imes et al. |
| 8,117,299 B2 | 2/2012 | Narayanaswami et al. |
| 8,126,685 B2 | 2/2012 | Nasle |
| 8,131,401 B2 | 3/2012 | Nasle |
| 8,140,279 B2 | 3/2012 | Subbloie |
| 8,140,667 B2 | 3/2012 | Keyghobad et al. |
| 8,176,112 B2 | 5/2012 | Hicks, III et al. |
| 8,204,979 B2 | 6/2012 | Vutharkar et al. |
| 8,214,270 B2 | 7/2012 | Schaefer et al. |
| 8,280,556 B2 | 10/2012 | Besore et al. |
| 8,306,634 B2 | 11/2012 | Nguyen et al. |
| 8,350,694 B1 | 1/2013 | Trundle et al. |
| 8,355,865 B2 | 1/2013 | Wagner et al. |
| 8,406,783 B2 | 3/2013 | Eitan et al. |
| 8,406,933 B2 | 3/2013 | Nagel et al. |
| 2002/0073217 A1 | 6/2002 | Ma et al. |
| 2002/0147006 A1 | 10/2002 | Coon et al. |
| 2002/0194500 A1 | 12/2002 | Bajikar |
| 2002/0196151 A1 | 12/2002 | Troxler |
| 2002/0198984 A1 | 12/2002 | Goldstein et al. |
| 2003/0120817 A1 | 6/2003 | Ott et al. |
| 2003/0122684 A1 | 7/2003 | Porter et al. |
| 2003/0149734 A1 | 8/2003 | Aaltonen et al. |
| 2003/0210126 A1 | 11/2003 | Kanazawa |
| 2004/0034484 A1 | 2/2004 | Solomita, Jr. et al. |
| 2004/0078153 A1 | 4/2004 | Bartone et al. |
| 2004/0087314 A1 | 5/2004 | Duncan |
| 2004/0119600 A1 | 6/2004 | Hampton |
| 2004/0133314 A1 | 7/2004 | Ehlers et al. |
| 2004/0193329 A1 | 9/2004 | Ransom et al. |
| 2005/0038326 A1 | 2/2005 | Mathur |
| 2005/0040247 A1 | 2/2005 | Pouchak |
| 2005/0040250 A1 | 2/2005 | Wruck |
| 2005/0044427 A1 | 2/2005 | Dunstan et al. |
| 2005/0060575 A1 | 3/2005 | Trethewey et al. |
| 2005/0090267 A1 | 4/2005 | Kotzin |
| 2005/0131583 A1 | 6/2005 | Ransom |
| 2005/0143863 A1 | 6/2005 | Ruane et al. |
| 2005/0144437 A1 | 6/2005 | Ransom et al. |
| 2005/0172056 A1 | 8/2005 | Ahn |
| 2005/0194457 A1 | 9/2005 | Dolan |
| 2005/0242945 A1 | 11/2005 | Perkinson |
| 2005/0246561 A1 | 11/2005 | Wu et al. |
| 2006/0012489 A1 | 1/2006 | Yokota et al. |
| 2006/0063522 A1 | 3/2006 | McFarland |
| 2006/0097063 A1 | 5/2006 | Zeevi |
| 2006/0099971 A1 | 5/2006 | Staton et al. |
| 2006/0102732 A1 | 5/2006 | Garrett et al. |
| 2006/0122715 A1 | 6/2006 | Schroeder et al. |
| 2006/0161635 A1 | 7/2006 | Lamkin et al. |
| 2006/0179079 A1 | 8/2006 | Kolehmainen |
| 2006/0253894 A1 | 11/2006 | Bookman et al. |
| 2006/0265489 A1 | 11/2006 | Moore |
| 2006/0276175 A1 | 12/2006 | Chandran |
| 2006/0283965 A1 | 12/2006 | Mueller et al. |
| 2007/0032225 A1 | 2/2007 | Konicek et al. |
| 2007/0037554 A1 | 2/2007 | Feeny |
| 2007/0037605 A1 | 2/2007 | Logan |
| 2007/0043477 A1 | 2/2007 | Ehlers et al. |
| 2007/0043478 A1 | 2/2007 | Ehlers et al. |
| 2007/0045431 A1 | 3/2007 | Chapman et al. |
| 2007/0054616 A1 | 3/2007 | Culbert |
| 2007/0055760 A1 | 3/2007 | McCoy et al. |
| 2007/0060171 A1 | 3/2007 | Sudit et al. |
| 2007/0061050 A1 | 3/2007 | Hoffknecht |
| 2007/0061266 A1 | 3/2007 | Moore et al. |
| 2007/0061487 A1 | 3/2007 | Moore et al. |
| 2007/0112939 A1 | 5/2007 | Wilson et al. |
| 2007/0114295 A1 | 5/2007 | Jenkins |
| 2007/0115902 A1 | 5/2007 | Shamoon et al. |
| 2007/0124026 A1 | 5/2007 | Troxell et al. |
| 2007/0136217 A1 | 6/2007 | Johnson et al. |
| 2007/0155401 A1 | 7/2007 | Ward et al. |
| 2007/0156265 A1 | 7/2007 | McCoy et al. |
| 2007/0156864 A1 | 7/2007 | McCoy et al. |
| 2007/0156882 A1 | 7/2007 | McCoy et al. |
| 2007/0158442 A1 | 7/2007 | Chapman, Jr. |
| 2007/0160022 A1 | 7/2007 | McCoy et al. |
| 2007/0162158 A1 | 7/2007 | McCoy et al. |
| 2007/0168486 A1 | 7/2007 | McCoy et al. |
| 2007/0176771 A1 | 8/2007 | Doyle |
| 2007/0188319 A1 | 8/2007 | Upton |
| 2007/0197236 A1 | 8/2007 | Ahn et al. |
| 2007/0221741 A1 | 9/2007 | Wagner et al. |
| 2007/0240173 A1 | 10/2007 | McCoy et al. |
| 2007/0241203 A1* | 10/2007 | Wagner ............. G05D 23/1905 236/1 C |
| 2007/0249319 A1 | 10/2007 | Faulkner et al. |
| 2007/0273307 A1 | 11/2007 | Westrick et al. |
| 2007/0274241 A1 | 11/2007 | Brothers |
| 2007/0282748 A1 | 12/2007 | Saint Clair et al. |
| 2007/0285510 A1 | 12/2007 | Lipton et al. |
| 2007/0287410 A1 | 12/2007 | Bae et al. |
| 2007/0287473 A1 | 12/2007 | Dupary |
| 2007/0288610 A1 | 12/2007 | Saint Clair et al. |
| 2007/0288975 A1 | 12/2007 | Cashman et al. |
| 2008/0004904 A1 | 1/2008 | Tran |
| 2008/0017722 A1 | 1/2008 | Snyder et al. |
| 2008/0046878 A1 | 2/2008 | Anderson |
| 2008/0082838 A1 | 4/2008 | Achariyakosol et al. |
| 2008/0099568 A1 | 5/2008 | Nicodem |
| 2008/0103610 A1 | 5/2008 | Ebrom et al. |
| 2008/0104208 A1 | 5/2008 | Ebrom et al. |
| 2008/0104212 A1 | 5/2008 | Ebrom et al. |
| 2008/0109830 A1 | 5/2008 | Giozbach et al. |
| 2008/0127325 A1 | 5/2008 | Ebrom et al. |
| 2008/0137670 A1 | 6/2008 | Ebrom et al. |
| 2008/0177678 A1 | 7/2008 | Di Martini et al. |
| 2008/0177994 A1 | 7/2008 | Mayer |
| 2008/0188963 A1 | 8/2008 | McCoy |
| 2008/0218307 A1 | 9/2008 | Schoettle |
| 2008/0219186 A1 | 9/2008 | Bell et al. |
| 2008/0219227 A1 | 9/2008 | Michaelis |
| 2008/0219239 A1 | 9/2008 | Bell et al. |
| 2008/0221737 A1 | 9/2008 | Josephson et al. |
| 2008/0249642 A1 | 10/2008 | Chen |
| 2008/0262820 A1 | 10/2008 | Nasle |
| 2008/0270562 A1 | 10/2008 | Jin |
| 2008/0271123 A1 | 10/2008 | Ollis et al. |
| 2008/0272934 A1 | 11/2008 | Wang et al. |
| 2008/0277486 A1 | 11/2008 | Seem et al. |
| 2008/0277487 A1 | 11/2008 | Mueller et al. |
| 2008/0281472 A1 | 11/2008 | Podgorny et al. |
| 2008/0281666 A1 | 11/2008 | Kessman et al. |
| 2008/0291855 A1 | 11/2008 | Bata et al. |
| 2008/0305644 A1 | 12/2008 | Noda |
| 2008/0313310 A1 | 12/2008 | Vasa et al. |
| 2009/0001182 A1 | 1/2009 | Siddaramanna et al. |
| 2009/0005061 A1 | 1/2009 | Ward et al. |
| 2009/0012704 A1 | 1/2009 | Franco et al. |
| 2009/0037938 A1 | 2/2009 | Frank |
| 2009/0062970 A1 | 3/2009 | Forbes, Jr. et al. |
| 2009/0063122 A1 | 3/2009 | Nasle |
| 2009/0063228 A1 | 3/2009 | Forbes, Jr. et al. |
| 2009/0065596 A1 | 3/2009 | Seem et al. |
| 2009/0070436 A1 | 3/2009 | Dawes et al. |
| 2009/0076749 A1 | 3/2009 | Nasle |
| 2009/0082888 A1 | 3/2009 | Johansen |
| 2009/0083167 A1 | 3/2009 | Subbloie |
| 2009/0093688 A1 | 4/2009 | Mathur |
| 2009/0098857 A1 | 4/2009 | De Atley |
| 2009/0098880 A1 | 4/2009 | Lindquist |
| 2009/0100492 A1 | 4/2009 | Hicks, III et al. |
| 2009/0103535 A1 | 4/2009 | McCoy et al. |
| 2009/0112522 A1 | 4/2009 | Rasmussen |
| 2009/0113037 A1 | 4/2009 | Pouchak |
| 2009/0129301 A1 | 5/2009 | Belimpasakis |
| 2009/0132070 A1 | 5/2009 | Ebrom et al. |
| 2009/0135836 A1 | 5/2009 | Veillette |
| 2009/0138099 A1 | 5/2009 | Veillette |

(56) References Cited

U.S. PATENT DOCUMENTS

| | | |
|---|---|---|
| 2009/0157529 A1 | 6/2009 | Ehlers et al. |
| 2009/0160626 A1 | 6/2009 | Jeon et al. |
| 2009/0164049 A1 | 6/2009 | Nibler et al. |
| 2009/0187499 A1 | 7/2009 | Mulder et al. |
| 2009/0193217 A1 | 7/2009 | Korecki et al. |
| 2009/0195349 A1 | 8/2009 | Frader-Thompson et al. |
| 2009/0204837 A1 | 8/2009 | Raval et al. |
| 2009/0240381 A1 | 9/2009 | Lane |
| 2009/0248702 A1 | 10/2009 | Schwartz et al. |
| 2009/0267787 A1 | 10/2009 | Pryor et al. |
| 2009/0270138 A1 | 10/2009 | Raveendran |
| 2009/0302994 A1 | 12/2009 | Rhee et al. |
| 2009/0305644 A1 | 12/2009 | Rhee |
| 2009/0312968 A1 | 12/2009 | Phillips et al. |
| 2009/0316671 A1 | 12/2009 | Rolf et al. |
| 2010/0017126 A1 | 1/2010 | Holcman et al. |
| 2010/0034386 A1 | 2/2010 | Choong et al. |
| 2010/0035587 A1 | 2/2010 | Bennett |
| 2010/0035613 A1 | 2/2010 | Schroter |
| 2010/0063867 A1 | 3/2010 | Proctor, Jr. et al. |
| 2010/0066507 A1 | 3/2010 | Myllymaeki |
| 2010/0069035 A1 | 3/2010 | Johnson |
| 2010/0069087 A1 | 3/2010 | Chow et al. |
| 2010/0070100 A1 | 3/2010 | Finlinson et al. |
| 2010/0070101 A1 | 3/2010 | Benes et al. |
| 2010/0075656 A1 | 3/2010 | Howarter et al. |
| 2010/0081375 A1 | 4/2010 | Rosenblatt et al. |
| 2010/0081468 A1 | 4/2010 | Brothers |
| 2010/0082174 A1 | 4/2010 | Weaver |
| 2010/0082176 A1 | 4/2010 | Chang |
| 2010/0082431 A1 | 4/2010 | Ramer et al. |
| 2010/0087932 A1 | 4/2010 | McCoy et al. |
| 2010/0088261 A1 | 4/2010 | Montalvo |
| 2010/0094475 A1 | 4/2010 | Masters et al. |
| 2010/0094737 A1 | 4/2010 | Lambird |
| 2010/0099410 A1 | 4/2010 | Sweeney et al. |
| 2010/0100253 A1 | 4/2010 | Fausak et al. |
| 2010/0113061 A1 | 5/2010 | Holcman |
| 2010/0115314 A1 | 5/2010 | Sultenfuss |
| 2010/0121499 A1 | 5/2010 | Besore et al. |
| 2010/0123414 A1 | 5/2010 | Antonopoulos |
| 2010/0127854 A1 | 5/2010 | Helvick et al. |
| 2010/0127889 A1 | 5/2010 | Vogel et al. |
| 2010/0130178 A1 | 5/2010 | Bennett et al. |
| 2010/0130213 A1 | 5/2010 | Vendrow et al. |
| 2010/0138764 A1 | 6/2010 | Hatambeiki et al. |
| 2010/0141437 A1 | 6/2010 | Karam et al. |
| 2010/0145534 A1 | 6/2010 | Forbes, Jr. et al. |
| 2010/0152997 A1 | 6/2010 | De Silva et al. |
| 2010/0156665 A1 | 6/2010 | Krzyzanowski et al. |
| 2010/0159936 A1 | 6/2010 | Brisbois et al. |
| 2010/0161148 A1 | 6/2010 | Forbes, Jr. et al. |
| 2010/0161149 A1 | 6/2010 | Nguyen et al. |
| 2010/0164713 A1 | 7/2010 | Wedig et al. |
| 2010/0165861 A1 | 7/2010 | Rrdland et al. |
| 2010/0169030 A1 | 7/2010 | Parlos et al. |
| 2010/0174643 A1 | 7/2010 | Schaefer et al. |
| 2010/0179670 A1 | 7/2010 | Forbes, Jr. et al. |
| 2010/0179672 A1 | 7/2010 | Beckmann et al. |
| 2010/0179708 A1 | 7/2010 | Watson et al. |
| 2010/0187219 A1 | 7/2010 | Besore et al. |
| 2010/0188239 A1 | 7/2010 | Rockwell |
| 2010/0188279 A1 | 7/2010 | Shamilian et al. |
| 2010/0191352 A1 | 7/2010 | Quail |
| 2010/0193592 A1 | 8/2010 | Simon et al. |
| 2010/0198713 A1 | 8/2010 | Forbes, Jr. et al. |
| 2010/0207728 A1 | 8/2010 | Roscoe et al. |
| 2010/0217450 A1 | 8/2010 | Beal et al. |
| 2010/0217451 A1 | 8/2010 | Kouda et al. |
| 2010/0217452 A1 | 8/2010 | McCord et al. |
| 2010/0217549 A1 | 8/2010 | Galvin et al. |
| 2010/0217550 A1 | 8/2010 | Crabtree et al. |
| 2010/0217642 A1 | 8/2010 | Crabtree et al. |
| 2010/0217651 A1 | 8/2010 | Crabtree et al. |
| 2010/0217837 A1 | 8/2010 | Ansari et al. |
| 2010/0218108 A1 | 8/2010 | Crabtree et al. |
| 2010/0222935 A1 | 9/2010 | Forbes, Jr. et al. |
| 2010/0228854 A1 | 9/2010 | Morrison et al. |
| 2010/0235008 A1 | 9/2010 | Forbes, Jr. et al. |
| 2010/0241275 A1 | 9/2010 | Crawford et al. |
| 2010/0249955 A1 | 9/2010 | Sitton |
| 2010/0250590 A1 | 9/2010 | Galvin |
| 2010/0256823 A1 | 10/2010 | Cherukuri et al. |
| 2010/0257539 A1 | 10/2010 | Narayanan et al. |
| 2010/0261465 A1 | 10/2010 | Rhoads et al. |
| 2010/0262298 A1 | 10/2010 | Johnson et al. |
| 2010/0262299 A1 | 10/2010 | Cheung et al. |
| 2010/0262336 A1 | 10/2010 | Rivas et al. |
| 2010/0272192 A1 | 10/2010 | Varadarajan et al. |
| 2010/0289643 A1 | 11/2010 | Trundle et al. |
| 2010/0299265 A1 | 11/2010 | Walters et al. |
| 2010/0299517 A1 | 11/2010 | Jukic et al. |
| 2010/0305773 A1 | 12/2010 | Cohen |
| 2010/0315235 A1 | 12/2010 | Adegoke et al. |
| 2010/0315438 A1 | 12/2010 | Horodezky et al. |
| 2010/0317332 A1 | 12/2010 | Bathiche et al. |
| 2010/0317371 A1 | 12/2010 | Westerinen et al. |
| 2010/0318198 A1 | 12/2010 | Smith et al. |
| 2010/0324956 A1 | 12/2010 | Lopez et al. |
| 2010/0324962 A1 | 12/2010 | Nesler et al. |
| 2010/0332373 A1 | 12/2010 | Crabtree et al. |
| 2011/0004350 A1 | 1/2011 | Cheifetz et al. |
| 2011/0004355 A1 | 1/2011 | Wang et al. |
| 2011/0004513 A1 | 1/2011 | Hoffberg |
| 2011/0015797 A1 | 1/2011 | Gilstrap |
| 2011/0015802 A1 | 1/2011 | Imes |
| 2011/0016023 A1 | 1/2011 | Zakas |
| 2011/0022239 A1 | 1/2011 | Forbes, Jr. et al. |
| 2011/0022242 A1 | 1/2011 | Bukhin et al. |
| 2011/0029655 A1 | 2/2011 | Forbes, Jr. et al. |
| 2011/0039518 A1 | 2/2011 | Maria |
| 2011/0040666 A1 | 2/2011 | Crabtree et al. |
| 2011/0046792 A1* | 2/2011 | Imes ............... F24F 11/006 700/278 |
| 2011/0046798 A1 | 2/2011 | Imes et al. |
| 2011/0046799 A1 | 2/2011 | Imes et al. |
| 2011/0046800 A1 | 2/2011 | Imes et al. |
| 2011/0046801 A1 | 2/2011 | Imes et al. |
| 2011/0047482 A1 | 2/2011 | Arthurs et al. |
| 2011/0051823 A1 | 3/2011 | Imes et al. |
| 2011/0054699 A1 | 3/2011 | Imes et al. |
| 2011/0054710 A1 | 3/2011 | Imes et al. |
| 2011/0061014 A1 | 3/2011 | Frader-Thompson et al. |
| 2011/0063126 A1 | 3/2011 | Kennedy et al. |
| 2011/0063999 A1 | 3/2011 | Erdmann et al. |
| 2011/0069719 A1 | 3/2011 | Fries, IV et al. |
| 2011/0077789 A1 | 3/2011 | Sun |
| 2011/0098869 A1 | 4/2011 | Seo et al. |
| 2011/0106326 A1 | 5/2011 | Anunobi et al. |
| 2011/0106327 A1 | 5/2011 | Zhou et al. |
| 2011/0106681 A1 | 5/2011 | Cockerell et al. |
| 2011/0113090 A1 | 5/2011 | Peeri |
| 2011/0115875 A1 | 5/2011 | Sadwick et al. |
| 2011/0117878 A1 | 5/2011 | Barash et al. |
| 2011/0117927 A1 | 5/2011 | Doyle |
| 2011/0126035 A1* | 5/2011 | Kaneko ............. H04L 41/0833 713/320 |
| 2011/0138024 A1 | 6/2011 | Chen et al. |
| 2011/0148626 A1 | 6/2011 | Acevedo |
| 2011/0153525 A1 | 6/2011 | Benco et al. |
| 2011/0160881 A1 | 6/2011 | Grey |
| 2011/0172837 A1 | 7/2011 | Forbes, Jr. |
| 2011/0173542 A1 | 7/2011 | Imes et al. |
| 2011/0202185 A1 | 8/2011 | Imes et al. |
| 2011/0202195 A1 | 8/2011 | Finch et al. |
| 2011/0202293 A1 | 8/2011 | Kobraei et al. |
| 2011/0211584 A1 | 9/2011 | Mahmoud |
| 2011/0214060 A1 | 9/2011 | Imes et al. |
| 2011/0224838 A1 | 9/2011 | Imes et al. |
| 2011/0227704 A1 | 9/2011 | Padmanabhan et al. |
| 2011/0231020 A1 | 9/2011 | Ramachandran et al. |
| 2011/0246606 A1 | 10/2011 | Barbeau et al. |
| 2011/0246898 A1 | 10/2011 | Imes et al. |
| 2011/0251725 A1 | 10/2011 | Chan |

(56) References Cited

U.S. PATENT DOCUMENTS

| | | | |
|---|---|---|---|
| 2011/0257809 A1 | 10/2011 | Forbes, Jr. et al. | |
| 2011/0258022 A1 | 10/2011 | Forbes, Jr. et al. | |
| 2011/0264290 A1 | 10/2011 | Drew | |
| 2011/0264296 A1 | 10/2011 | Drake et al. | |
| 2011/0282497 A1 | 11/2011 | Josephson et al. | |
| 2011/0295393 A1 | 12/2011 | Lindahl | |
| 2011/0296169 A1 | 12/2011 | Palmer | |
| 2011/0302431 A1 | 12/2011 | Diab et al. | |
| 2011/0307101 A1 | 12/2011 | Imes et al. | |
| 2011/0316664 A1 | 12/2011 | Olcott et al. | |
| 2012/0022709 A1 | 1/2012 | Taylor | |
| 2012/0061480 A1 | 3/2012 | Deligiannis et al. | |
| 2012/0077493 A1* | 3/2012 | Robbins | H04W 4/021 455/435.1 |
| 2012/0126020 A1 | 5/2012 | Filson et al. | |
| 2012/0169249 A1 | 7/2012 | Loveland et al. | |
| 2012/0179547 A1 | 7/2012 | Besore et al. | |
| 2012/0189140 A1 | 7/2012 | Hughes et al. | |
| 2012/0312874 A1 | 12/2012 | Jonsson | |
| 2013/0087629 A1 | 4/2013 | Stefanski et al. | |
| 2013/0099010 A1 | 4/2013 | Filson et al. | |
| 2014/0220883 A1* | 8/2014 | Emigh | H04H 20/61 455/3.01 |
| 2014/0273822 A1* | 9/2014 | Gutierrez | H04W 76/10 455/41.1 |

FOREIGN PATENT DOCUMENTS

| | | |
|---|---|---|
| JP | 2006092035 A | 4/2006 |
| WO | 2002027639 A1 | 4/2002 |
| WO | 2007109557 A2 | 9/2007 |
| WO | 2008134460 A1 | 11/2008 |
| WO | 2009034720 A1 | 3/2009 |
| WO | 2009036764 A2 | 3/2009 |
| WO | 2009067251 A1 | 5/2009 |
| WO | 2009097400 A1 | 8/2009 |

OTHER PUBLICATIONS

Slavin, Alison Jane and Trundle, Stephen Scott, Remote Thermostat Control/Energy Monitoring, U.S. Appl. No. 61/179,224, filed May 18, 2009; 14 pages.

Gupta, Manu, A Persuasive GPS-Controlled Thermostat System, Royal Institute of Technology, Stockholm, Sweden, Jun. 2006; Pune Institute of Computer Technology, University of Pune, India, Jun. 2003 and Massachusetts Institute of Technology, Sep. 2008; 89 pages.

Gupta, Manu, Intille, Stephen S. and Larson, Kent, Adding GPS-Control to Traditional Thermostats: An Exploration of Potential Energy Savings and Design Challenges. House_n. Massachusetts Institute of Technology, Cambridge, MA 02142 USA. May 11-14, 2009, Springer-Verlag Berlin, Heideberg.

"A step-by-step guide to installing the 1st generation Nest Learning Thermostat," Article #1161, 2013 Nest Labs. pp. 1-6. http://http://support.nest.com/article/A-step-by-step-guide-to-installing-the-1st-generation-Nest-Learning-Thermostat, last accessed Feb. 1, 2013.

Klym et al., The Evolution of RFID Networks: The Potential for Disruptive Innovation, Mar. 2006, MIT Communication Futures Program, pp. 1-20.

Pering et al., Spontaneous Marriages of Mobile Devices and Interactive Space, Communication of the ACM, Sep. 2005, pp. 53-59.

Jaring et al., Improving Mobile Solution Workflows and Usability Using Near Field Communication Technology, 2007, Springer-Verlag Berlin Heidelberg, pp. 358-373.

"Wi-Fi", Wikipedia, printed Jul. 8, 2013.

Request Response, Wikipedia, printed Jul. 25, 2013.

Inncom International, Inc. "Installation User Manual", Revision 3.1, Sep. 12, 2006, pp. 1-36.

Peffer, T., et al. "A Tale of Two Houses: The Human Dimension of Demand Response Enabling Technology from a Case Study of an Adaptive Wireless Thermostat," ACEEE Summer Study on Energy Efficiency in Buildings, 2008.

BAYweb Thermostat Owner's Manual, Bay Controls, LLC, published Nov. 11, 2009.

Stigge, B. "Informed Home Energy Behavior: Developing a tool for homeowners to monitor, plan and learn about energy conservation," Massachusetts Insitute of Technology, 2001.

Mozer, M., et al. The Neurothermostat: Predictive Optimal Control of Residential Heating Systems. "Advances in Neural Information Processing Systems 9." MIT Press, 1997.

e4 Smart Digital Thermostat—E529, Inncom by Honeywell, published Aug. 2012.

Seligman, C., et al. Behavior Approaches to Residential Energy Conservation. "Saving Energy in the Home." Ballinger Publishing Co., 1978.

Singapore Written Opinion dated Jun. 9, 2017 in corresponding Singapore Patent Application No. 11201605494Q.

Singapore Intellectual Property Office, Written Opinion issued in Singapore Patent Application No. 11201605494Q dated Apr. 24, 2018 (6 pages).

Mexican Patent Office Action issued in Mexican Patent Application No. MX/a/2016/008828 dated Sep. 15, 2018 (4 Total pages).

\* cited by examiner

SYSTEM, DEVICE, AND APPARATUS FOR COORDINATING ENVIRONMENTS USING NETWORK DEVICES AND REMOTE SENSORY INFORMATION

CROSS REFERENCE TO RELATED APPLICATION

This application claims the benefit of and priority to U.S. provisional application Ser. No. 61/924,048 filed Jan. 6, 2014, the entire disclosure of which is incorporated herein by reference.

FIELD OF THE DISCLOSURE

This disclosure relates to a automating use of sensor based data, and more particular toward a system, device and apparatus for coordinating environments using networked devices and remote sensory information.

BACKGROUND

Historically, devices that control items in the home have been limited in their abilities to be automatically adjusted based on a users current needs. For example, thermostats that are installed in hallways or other locations are used to control temperature throughout the entire residence. However, the temperature in a hallway may not be the same as temperature in a bedroom or a kitchen. Such traditional thermostats leave the homeowner with having to continuously adjust temperatures to achieve a desired goal. Other limitations of traditional thermostats or other power controlling devices within the home is their lack of working in unison to achieve a desired goal. Traditional light switches lack the ability to be altered automatically based on a user's desire to change an operating condition. Additionally, traditional light switches and other devices require extensive and costly wiring to implement and control devices in a home. Even more, such devices are not able to be programmed and may require expensive programming hardware and software that must be maintained and updated by a service provider. What is needed in the art is an automatic system to coordinate multiple environments at a residence on a room by room basis that is easy to program and cost effective.

SUMMARY OF THE DISCLOSURE

According to an aspect of the disclosure, a system, method and device for automating use of remote resources using remote sensory information and operating conditions is provided.

According to an aspect of the disclosure, an intelligent remote sensor enabled apparatus is disclosed. The apparatus can include a wireless communication device configured to communicate with a mobile device and an environment coordinator located at a site. The apparatus further includes an operating condition selector capable of enabling a manual selection of an operating condition of a network connected device at the site. The apparatus also includes a processor configured to process a selection of the operating condition selector to enable activation of a setting of the network connected device, and detect a connection of the mobile device to the wireless communication device. The processor can further initiate communication of setting information to the environment coordinator to alter the operating condition of the network connected device. The apparatus further includes a memory configured to store the setting information used by the processor.

According to another aspect of the disclosure, a system is disclosed. The system can include an intelligent remote sensor configured to communicate sensory based information to a network device and a mobile device. The system further includes an environment coordinator configured to communicate with the intelligent remote sensor to initiate coordinating operating conditions of the network device at a site. The system also includes a mobile application configured to be deployed on the mobile device and communicate with the intelligent remote sensor to automatically alter an operating condition of the network device when the mobile device is within a specific region of the site.

Various other aspects of the disclosure are provided in the abstract, description of the drawings, and claims provided herein.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

The following description in combination with the Figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings. However, other teachings can certainly be utilized in this application. The teachings can also be utilized in other applications and with several different types of architectures such as distributed computing architectures, client/server architectures, or middleware server architectures and associated components.

Devices or programs that are in communication with one another need not be in continuous communication with each other unless expressly specified otherwise. In addition, devices or programs that are in communication with one another may communicate directly or indirectly through one or more intermediaries.

Embodiments discussed below describe, in part, distributed computing solutions that manage all or part of a communicative interaction between network elements. In this context, a communicative interaction may be intending to send information, sending information, requesting information, receiving information, receiving a request for information, or any combination thereof. As such, a communicative interaction could be unidirectional, bidirectional, multi-directional, or any combination thereof. In some circumstances, a communicative interaction could be relatively complex and involve two or more network elements. For example, a communicative interaction may be "a conversation" or series of related communications between a client and a server—each network element sending and receiving information to and from the other. The communicative interaction between the network elements is not necessarily limited to only one specific form. A network element may be a node, a piece of hardware, software, firmware, middleware, another component of a computing system, or any combination thereof.

For purposes of this disclosure, a network device, environment coordinator, or intelligent remote sensor can include various types of devices, software, applications, methods, drivers, media, services, controllers, platforms, interfaces, and can further include an environment management system, environment controller, energy management system, customer engagement portal, customer engagement platform, energy management apparatus, network device, controller, home automation controller, energy controller, controller module, site controller, processing resources, or any combination thereof can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes.

For example, a network device, environment coordinator, or sensor can include one or any combination of an energy management system, an energy management device, a mobile device, a mobile application, a personal computer, a desktop application, a web-based interface, a hosted application, hosted software, hosted services, an application interface, a PDA, a consumer electronic device, a media device, a smart phone, a cellular or mobile phone, a smart utility meter, an advanced metering infrastructure, a smart energy device, an energy display device, a home automation controller, an energy hub, a smart energy gateway, a set-top box, a digital media subscriber system, a cable modem, a broadband communication device, a fiber optic enabled communications device, a media gateway, a home media management system, a robotically controlled device, a robotically controller cleaning device such as a Broomba®, a media server, a game console, a network server, a network storage device, a wireless speaker, a customer engagement platform, a customer engagement portal, retail energy provider's server, a wholesale energy provider's server, a COOP energy provider's server, a retail business server, a commercial site server, an industrial site server, a multi-residential site server, a temporary lodging server, a hotel server, a motel server, a condominium server, a utility provider's server which can include waste, water, power or combinations thereof, an energy substation, a news media server, a weather server, an advertisement server or service provider, a network radio server or service provider, a network media server or service provider, a music server or service provider, a search engine server or service provider, an information server or service provider, a wireless information network device, a vehicle charging station, a renewable energy production device, a renewable energy control device, an energy storage management system, a smart appliance, an HVAC system, a water pump, a heat pump, a hot water heater, a thermostat (TSTAT), an energy controller, an irrigation system, a lighting system, an alarm system, a smart power outlet, an energy detection device, a garage door opening system or device, a power measurement device, a power measurement unit, an air handler, a wireless air damper, a humidity control system, a heat and motion sensing device, a smart power outlet, a switch router, a wireless router, an automobile or transportation device, an electric vehicle, a network communication device, or any other suitable device or system, and can vary in size, shape, performance, functionality, and price.

According to an aspect, a network device, environment coordinator, or sensor can include one of a combination of memory, processing resources or controllers such as a microcontroller or central processing unit (CPU) or hardware or software control logic to enable management of a resource. Additional components can include one or more storage devices, one or more wireless, wired or any combination thereof of communication devices, modules, and ports to communicate with external resources as well as various input and output (I/O) devices, touch controllers, touch screens and display devices. A resource can also include one or more buses operable to transmit communication of management information between the various hardware components, and can communicate using wire-line communication data buses, wireless network communication, or any combination thereof. For example, a resource can deploy communication using a data bus internal to a device and can also include using a network, wireless network, wireless energy network, an information network, a wireless environment network, a wireless home environment network, or any other type of network capable of communicating resource information.

According to a further aspect, a network device, environment coordinator, or sensor can use any combination of components, devices or modules to communicate information, including various types and variants of wireless and wire-line communication configurable to manage and establish communication at a site, including associated protocols or enhancements thereto including, but not limited to, any combination or portion of, IP-based communication, Broadband communication, IEEE 802.15-based wireless communication, Zigbee communication, INSETEON communication, X10 communication protocol, Z-Wave communication, Bluetooth communication, Bluetooth Low Energy (LE) communication, WIFI communication, IEEE 802.11-based communication, a communication within a frequency range of 900 MHz-2.5 GHz; Infrared communication device, 6LowPAN communication, power line communication device, RFID communication, NFC communication, IEEE 802.16-based communication, Infrared-based communication, various proprietary wireless communications, or any combination thereof.

According to a further aspect, information can include information that can be processed and used by a network device, environment coordinator, or intelligent remote sensor and can include information that can be used to manage an environment, or any combination of thereof, and can include information received from a variety of sources. According to an aspect, information can include customer engagement information, media management information, media availability information, resource management information, media data, energy data, control data, content, media content, advertisements, videos, music, animated advertisements, energy management information, profile information, user information, device information, provisioning information, device identifiers, device names, model numbers, serial numbers, activation data such as date and time first used, IP addresses, coordinates of a site, coordinates of a resource, device drivers, and various other types of information described herein.

As described herein, a flow charted technique, method, or algorithm may be described in a series of sequential actions. Unless expressly stated to the contrary, the sequence of the actions and the party performing the actions may be freely changed without departing from the scope of the teachings. Actions may be added, deleted, or altered in several ways. Similarly, the actions may be re-ordered or looped. Further, although processes, methods, algorithms or the like may be described in a sequential order, such processes, methods, algorithms, or any combination thereof may be operable to be performed in alternative orders. Further, some actions within a process, method, or algorithm may be performed simultaneously during at least a point in time (e.g., actions performed in parallel), can also be performed in whole, in part, or any combination thereof.

As used herein, the terms "comprises," "comprising," "includes," "including," "has," "having" or any other variation thereof, are intended to cover a non-exclusive inclusion. For example, a process, method, article, system, or apparatus that comprises a list of features is not necessarily limited only to those features but may include other features not expressly listed or inherent to such process, method, article, system, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Also, the use of "a" or "an" is employed to describe elements and components described herein. This is done merely for convenience and to give a general sense of the scope of the invention. This description should be read to include one or at least one and the singular also includes the plural, or vice versa, unless it is clear that it is meant otherwise. For example, when a single device is described herein, more than one device may be used in place of a single device. Similarly, where more than one device is described herein, a single device may be substituted for that one device.

Unless otherwise defined, all technical and scientific terms used herein have the same meaning as commonly understood by one of ordinary skill in the art to which this invention belongs. Although methods and materials similar or equivalent to those described herein can be used in the practice or testing of embodiments of the present invention, suitable methods and materials are described below. All publications, patent applications, patents, and other references mentioned herein are incorporated by reference in their entirety, unless a particular passage is cited. In case of conflict, the present specification, including definitions, will control. In addition, the materials, methods, and examples are illustrative only and not intended to be limiting.

To the extent not described herein, many details regarding specific materials, processing acts, and circuits are conventional and may be found in textbooks and other sources within the computing, electronics, and software arts.

Figure 1:
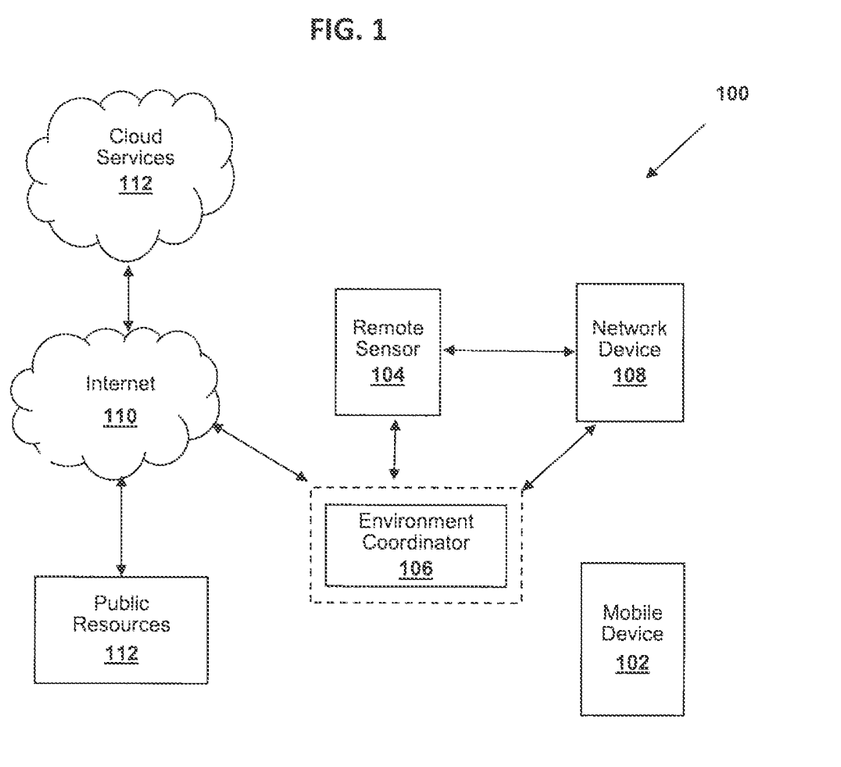
FIG. 1 illustrates a diagram of a network and system to coordinate environments at a site according to an aspect of the disclosure.

FIG. 1 illustrates a diagram of a network and system to coordinate environments at a site according to an aspect of the disclosure. Illustrated generally at 100, the system and network can include a mobile device 102, capable of being connected one or more of a remote sensor 104, an event coordinator 106, of a network device. Mobile device 102 can communicate directly to devices at a site through Internet 110.

According to an aspect, system and network 100 are configured to automatically coordinate environments and network devices while users or mobile devices are away from a site, then provide automatic control within regions, rooms, or zones within the site as described herein. System and network 100 are configured to provide macro-proximity initiated environments and micro-proximity initiated environments to control coordinating home environments, resulting in user benefits that are simple to use, and cost effective.

According to an aspect, mobile device 102 can include various types of devices that can be portable, such as an iPhone® device, Android® device, Blackberry® device, Windows® device, or any other mobile device, and can also include a tablet device such as an iPad®, Kindle®, and the like, a portable computer such as a laptop, portable electronics such as camera's, wireless radios, wireless speakers, or various other portable devices capable of being used with environmental coordinating system and network 100.

According to an aspect, communication with environment coordinator 106 can exist in a variety of embodiments as described above, including but not limited to network devices, mobile devices, sensors, and systems and include using any combination of communication described herein. For example, mobile device 102 can communicate directly with environment coordinator 106 using a local WIFI or 802.11 based communication, Bluetooth communication, or various other local wireless communication, or any combination thereof. According to a further aspect, mobile device 102 can communication within a mobile environment using a subscriber based wireless data communication network such as a 3G network, 4G network, EDGE network, a cellular network, other wireless data communication, or any combination thereof.

According to another aspect, public resourced 112 can be provided. Pubic resources 112 can include hosted resources that are generally publically available, or with minimal effort, can be accessed and utilized. Resources can include storage resources, communication infrastructure resources such as PUB-SUB, XMPP, instant Messaging (IM), SMS messaging, TCP/IP, Internet communication infrastructure and protocol such as IPv4, IPv6 to support, in addition to other features, unique addresses for resources, and various other types of public resources that can be used in combination with communicating information using Internet 110.

According to another aspect, resource management system 100 can include using one or more cloud services 110. Cloud services 110 can be hosted by the same provider or in other instances, cloud services 110 can be hosted by multiple providers and accessed as needed or desired in various combinations. Cloud services 110 can include one or combinations of, but are not limited to, sources that can include resource information such as a streaming music library source, streaming radio source, streaming video source, pay-per-view media source, paid music source, subscription services source, on-line photo source, energy management source, customer engagement source, utility source, thermostat management source, web-services source, home security source, website, customer engagement source, savings tip source, video source, software update source, a streaming music library source, or any combination thereof.

According to a further aspect, a coordinator, for example, an environment coordinator 106 or an event coordinator can allow for enabling access to one or more on-line streaming media sources, such as Pandora, Slacker Radio, Spotify, TuneIn Radio, Weather services, YouTube, and any other combination of cloud services 112. For example, environment coordinator 106 can include encoded logic capable of accessing an API hosted by Pandora, and can manage streaming audio to one or more wireless speaker resources within a home. As such, environment coordinator 106 can act as a bridge between Pandora and a wireless speaker, or can also act as a temporary bridge to initiate direct communication with a speaker resource. Additionally, a user may be able to select music from mobile device 102 or another resource capable of allowing selection of music from Pandora's hosted services, and communicating to a speaker resource.

According to a further aspect, mobile device 102 can also include proximity control functionality. For example, proximity control can include using various types of location services to detect a location of mobile device 102, and outputting resource information based on the location, distance, travel time, travel speed, and various other parameters that can be determined using location services. According to an aspect, other web services that may be cloud services 110 can also be accessed upon detecting a location of mobile device 102. Additionally, environment information and sensor based information may be communicated in response to a location of mobile device 102.

Figure 2:
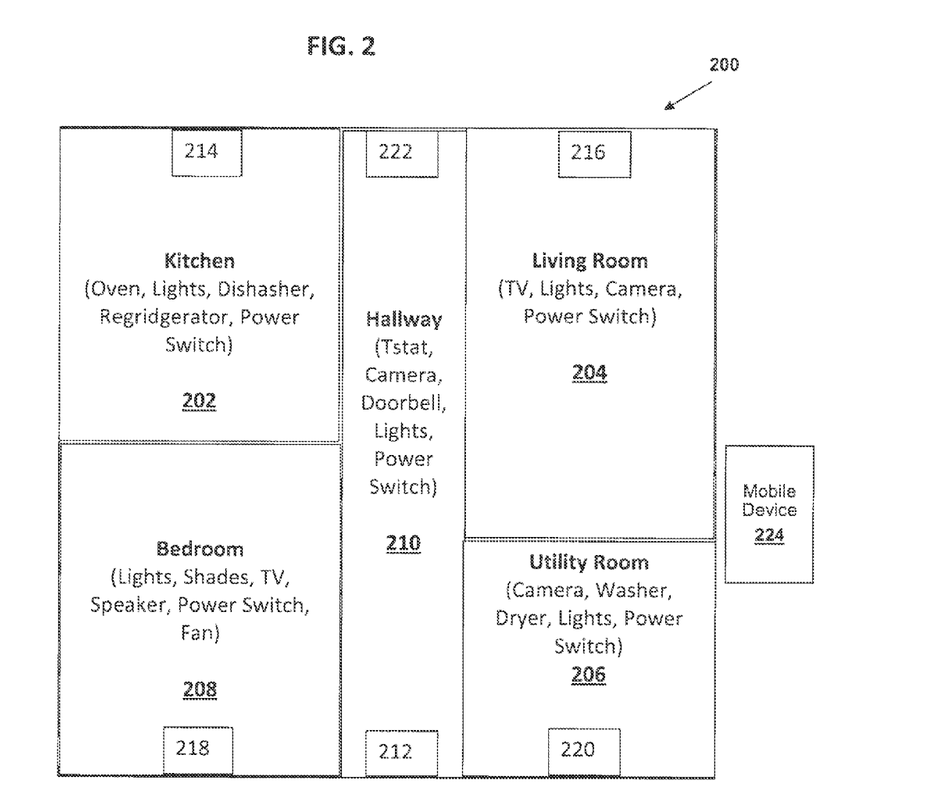
FIG. 2 illustrates a diagram of system configured to coordinate environments using intelligent remote sensors at a site according to an aspect of the disclosure.

FIG. 2 illustrates a diagram of system configured to coordinate environments using intelligent remote sensors at a site according to an aspect of the disclosure. A system, illustrated generally at site 200, can be used to coordinate environments at site 200. Site 200 is an example of a residential site however various other types of sites can deploy the system of FIG. 2. For example, small business, manufacturing facilities, offices, hotels/motels, condominiums, apartments, or various other sites that may benefit from the system of FIG. 2 can be considered. Additionally, site 200 is illustrated as a single site however it should be understood that multiple sites can be managed as needed or desired.

According to an aspect, site 200 includes a kitchen 202, a living room 204, a utility room 206, a bedroom 208, and a hallway 210. Though not expressly illustrated, it should be understood that doors, windows, locks and various other building materials may be used at site 200. Each room also includes various other types of network devices that can be accessed within site 200. For example, kitchen 202 can include an oven, lights, a dishwasher, a refrigerator, and one or more power switches (each not expressly shown). Similarly, living room 204 can include a television, lights, a camera, and one or more power switches (each not expressly shown). Utility room 206 can include a camera, a washer, a dryer, indoor and outdoor lights, and one or more power switches (each not expressly shown). Bedroom 208 can include lights, shades, a TV, a fan, a speaker, and one or more power switches (each not expressly shown). Hallway 210 can include a thermostat, a camera, a doorbell, indoor and outdoor lights, and one or more power switches (each not expressly shown). Each network device shown in FIG. 2 can be provided in various ways, configurations, and combinations as a user desires.

For purposes of the disclosure, the network devices can be accessed and controlled by sensors and remote sensors, controllers and environment coordinators, mobile devices, mobile applications, or various other devices or combinations thereof at site 200. For example, an owner or user of site 200 can possess a mobile device 224 having an operating system, mobile applications, or various other device communication capabilities configured to modify, access, or control an environment at site 200.

According to a further aspect, site 200 also includes distributed sensors within each room of site 200. Each sensor can be placed within each room and can be provided as intelligent remote sensors (described below). For example, kitchen 202 can include a first sensor 214, living room 204 can include a second sensor 216, utility room 206 can include a third sensor 220, bedroom 208 can include a fourth sensor 218, and hallway 210 can include a fifth sensor 222. Although illustrated as being within each of the rooms, one or more of the sensors can be placed internal or external to the building or walls of site 200.

According to an aspect, site 200 also includes a thermostat 212 placed within hallway 210 to regulate temperature at site 200. Various forms of communication can be deployed to connect with thermostat 212 and thermostat 212 illustrates an example of a network device having environment coordinator capabilities (described below). For purposes of describing the system of FIG. 2, thermostat 212 can include Wifi communication, Bluetooth BLE communication, Zigbee communication, and Z-Wave communication. In various other forms, additional wireless and wire-line communication can be used within the system of FIG. 2.

According to an aspect, the system of FIG. 2 uses intelligent remote sensors that utilize batteries to power each of the intelligent remote sensors. Additionally as described below, each of the intelligent remote sensors can communicate wirelessly with network devices located within each room, other intelligent remote sensors, and network devices external to a room as needed. For example, sensor 220 can be configured to alter an operating condition of devices within utility room 206 configured as network devices. For example, utility room 220 may include a camera and LED lights capable of being used as network devices. As such, sensor 220 can be configured to turn on or off a wireless camera, and can further be capable of turning on or off lights without the use of a light switch. For example, an LED light configured as a network device may be installed within a ceiling. Power to turn the light on or off can be provided within the light housing at the ceiling directly from a power source at site 200. As such, sensor 220 can be configured to turn the LED light on or off without the use of a light switch on a wall thereby reducing the overall cost for running copper wiring between light switches and lights installed within a ceiling or other location at site 200. In this manner, a significant reduction in the overall consumption of copper material can further be realized using intelligent remote sensors at site 200.

In other forms, each sensor can communicate through mobile device 224 to provide sensory date to an environment coordinator. For example, a sensor can detect an availability to communicate sensory data using a mobile application of a mobile device configured to communicate with an environment coordinator such as thermostat 212. For example, mobile device may communicate with sensor using Bluetooth LE and mobile device may receive information using Bluetooth LE and communicate to thermostat 212 using another network such as Wi-Fi. In this manner, In other forms, the sensors can communicate directly to an environment coordinator 212 and coordinator 212 can initiate coordinating environments on a room-by-room basis.

According to another aspect, site 200 can include thermostat 212 capable of coordinating environments within site 200. For example, thermostat 212 can be configured to communicate with each sensor installed at site 200 using low-power communication such as Bluetooth LE, Zigbee, or Z-Wave. Thermostat 212 can include an environment coordinator that manages environments using sensory-based information communicated from a sensor. For example, sensory-based information can include an operating status of a Z-wave enable LED light, and a Zigbee enabled power switch. Additionally, the intelligent remote sensor may communicate sensory-based information received from the Z-wave LED and the Zigbee enabled switch to thermostat 212 using Bluetooth LE communication. As such, multi-network communication can be combined into a Bluetooth LE communication that can be sent to thermosat 212 over a Bluetooth network.

According to a further aspect, intelligent remote sensor may also detect a temperature within a room and whether an individual is present within the room. As such, thermostat 212 can receive the sensory information and process accordingly. For example, if a user is present within a room, and an LED light is on, additional information such as room temperature may be obtained. A user may have set up an environment preference to have the temperature sensed by intelligent remote sensor used by thermostat 212 to manage temperature within another room. For example, thermostats are typically installed in remote places such as hallway 212 and away from living spaces such as living room 204. As such, the temperature read in the hallway is typically used to control the temperature throughout site 200, with no regard to a presence of a user or desire to have a temperature changed. Using sensor 216 within living room 204 and presence awareness, sensor information that includes the actual room temperature can be communicated to thermostat 212 and thermostat 212 can modify heating and cooling conditions using the temperature sensory information. In this manner, a user can move from room to room and have room temperatures sensed end communicated to thermostat 212. Thermostat 212 can then coordinate environments for the user.

According to a further aspect, mobile device 224 can be used to initiate or maintain coordination of environments at site 224. For example, general settings and applications loaded within mobile device 224 can be used to coordinate environments on a room-by-room, or site-by-site basis. Such coordination settings can be stored on mobile device 224, and can be sent to various other network devices at site 200, or another event coordinator deployed at site 200. According to an aspect, the system of FIG. 2 can include intelligent remote sensors capable of communicating sensory-based information to a network device and mobile device 224. An environment coordinator can be installed on a network device such as thermostat 212 or another device capable of communicating with intelligent remote sensor to initiate coordinating operating conditions of a network device at site 200. Mobile device 224 can also include a mobile application configured to communicate with intelligent remote sensor to automatically alter an operating condition of the network device within a specific location or region of site 200.

According to a further aspect, an environment can be coordinated without mobile device 224 being present within a room. For example, a user may be charging mobile device 224 in kitchen 202. However, as a user enters bedroom 208, a user may want the lights to turn on, music to begin playing, and shades to be drawn. Sensor 218 can be manually selected or touched to initiate having each desired network device be altered to a desired operating condition. Sensor 218 can then send a signal to an environment coordinator to initiate altering operating conditions and create an environment. In this manner, mobile device 224 need not be present to coordinate an environment.

According to a further aspect, a sensor can include multiple environments preloaded or created to be used. For example, a user may have programmed multiple environments to be used in a room either by manual selection, selection through a schedule, or automatic selection based on a presence. For example, a user may have various combinations of network devices and operating conditions altered by multiple taps on a touch button of a sensor. In this manner, lights can be increased or dimmed, colors changed, shades drawn up, down, partial, dishwasher turning on or off, temperature regulated in a room, television turning on or off, or a variety of other actions desired by a user to coordinate an environment. According to some aspects, actions or events can be preloaded and a user can access as network devices are installed and connected at site 200. According to a further aspect, a user can schedule use of a network device using a scheduling tool (not expressly show) to coordinate environments. A scheduling tool that creates time of day, days, weeks, etc. schedules can be created and accessed by intelligent remote sensor to coordinate an environment. As such, various combinations of environments can be accessed through manual selection, selecting a schedule, or automatic selection based on a presence.

According to an aspect, automatic environment coordination can be obtained using Bluetooth LE or iBeacon technology deployed by mobile device 224 and a sensor. For example, sensor 216 can be set up to transmit a Bluetooth LE signal having a specific range to create a zone within living room 204. As a user having mobile device 224 enters the zone or living room 204, sensory information can be read by mobile device 224 and an environment can be automatically coordinated for network devices. Similarly, as mobile device 224 leaves living room 204, a Bluetooth LE or iBeacon signal can be lost and another environment for living room 204 can be coordinated. In this manner, room-by-room or zone-by-zone environments can be automatically created. According to an aspect, a sensor, mobile device, or network device can be used to coordinate an environment when a Bluetooth LE or iBeacon signal is obtained or lost between a sensor and a mobile device.

According to an aspect, multiple mobile devices can be used at site 200. For example, the system in FIG. 2 can be set up to be used with each user having their own preferences within a mobile device. However, in another form, when a setting or environment may be created, each of the mobiles will include the same settings for each room or zone within site 200. For example, environment coordinator can establish if independent settings are to be used, and monitor activity of each user through the home and coordinate environments accordingly. For example, an identifier of each mobile device and corresponding settings or user account may be coordinated and as a user moves throughout a home, environments are modified accordingly. In another form, environment coordinator may be selected, in a mobile app or on a display of a network device or other, to use the same settings for multiple users. In this manner, environment coordinator can share the settings amongst mobile devices and network devices as needed.

According to a further aspect, sensors can be used to extend the range. For example, if a short range wireless communication is being used by a sensor, one ore more sensors can be used to connect or bridge a signal to another sensor. For example, thermostat 212 may want to receive sensory data from remote sensor 214 to manage temperature within kitchen 202. Additionally, thermostat 214 may be using Bluetooth LE as a primary wireless communication to sensors. However, sensor 214 may be out of range. As such, sensor 222 can serve as an extender to communicate sensory data between sensor 214 and thermostat 212. Other sensors can also be added or connected to such as sensor 216 or others as needed or desired. In this manner, a mesh-like network can be created to communicate sensory-enabled information at site 200.

According to another aspect, management of power consumption of sensors can be done based on a presence of a user external and internal to site 200. A key attribute to wireless devices such as sensors in FIG. 2 is the sensors network or communication frequency to be reduced in response to a users location within site 200. For example, as a user moves between rooms transmission or wireless signals can be reduced therefore extending the life of a battery. Similarly when a user gets closer or within range of the sensor, it can wake up and become active with communications. In other forms, a mobile device may be detected on a room by room basis or zone basis to activate and deactivate communication frequency, preserving battery life.

According to another aspect, battery consumption can be reduced based on a presence of a user at a site. For example, as mobile device 224 moves away from site 200, wireless signals of each sensor, or a select group of sensors, can be reduced. For example, signal strength and frequency can be reduced as a user exceeds a distance, geofence, loss of Wi-Fi, and the like. As a user begins to travel or arrives home and distance, geofence, Wi-Fi, etc. is detected, signal strength and frequency of a sensor can be increased as desired. In this manner, batteries that may normally only last for 6 months can be extended to 2-5 years thereby reducing the need to purchase and consume batteries on a frequent basis.

Figure 3:
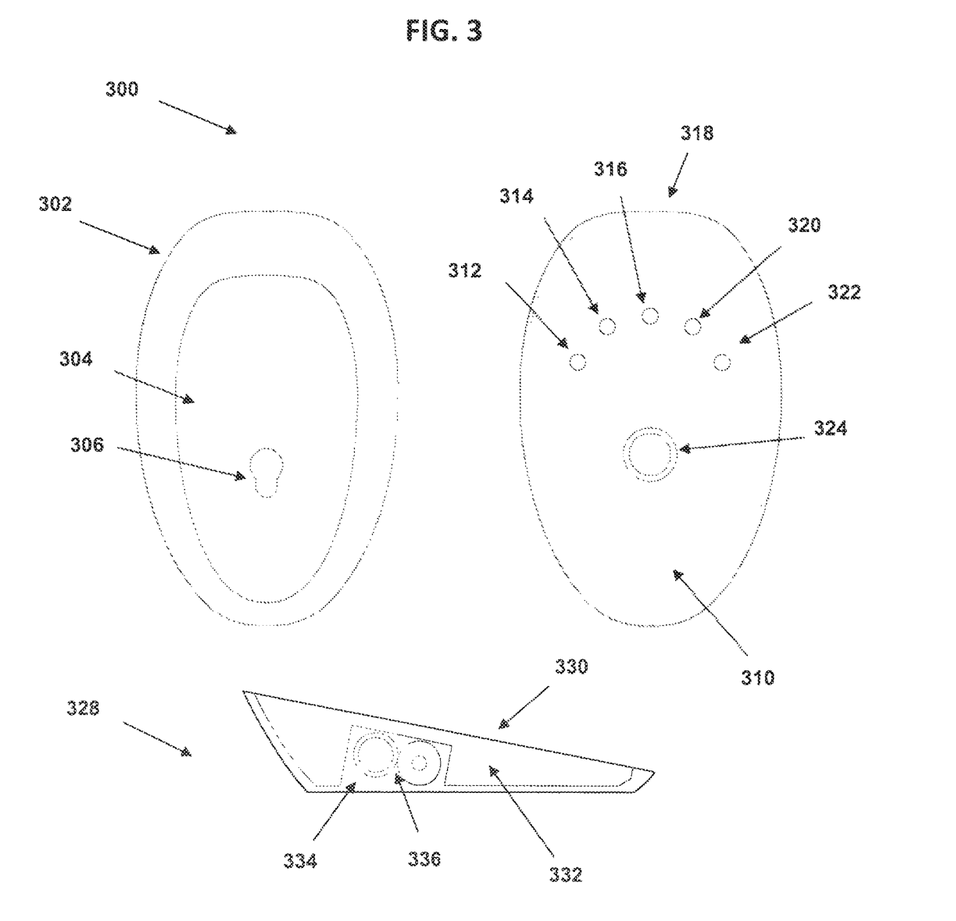
FIG. 3 illustrates a diagram of perspective views of an intelligent remote sensor according to an aspect of the disclosure.

FIG. 3 illustrates a diagram of perspective views of a sensor configured as an intelligent remote sensor according to an aspect of the disclosure. Illustrated generally at 300, a bottom view 302, top view 308 and side view 328 are provided. Bottom vie 302 include a bottom surface 304 that can include a plastic material such as ABS, PC or other. Bottom surface 304 can also include an anti-sliding or reducing material such as a rubber surface and the like. Bottom surface 204 can also include a hole or aperture 306 to allow for hanging sensor 300 on a wall or vertical surface.

According to an aspect, front view 08 includes a front surface 310 including a lighting and touch sensors to manually activate use of sensor 300. Front surface 310 includes a main touch sensor 324, and several indicators or visual lighting surfaces that can be illuminated. For example, front surface 310 include a first LED 312, a second LED 314, a third LED 316, a fourth LED 320, and a fifth LED 322. Various other LEDs can be added or removed as desired. During use, touch sensor 324 can also be illuminated using an LED or light pipe that extends around touch sensor 324.

According to a further aspect, side view 328 illustrates sensor 300 having a wedge like or angled surface 330 to allow for ease of use. Sensor 300 also include a cavity 334 along side surface 332 to allow for accessing one or more batteries 336 used to power sensor 300.

During use, sensor 300 can be automatically used through the use of Bluetooth or other wireless communication as described herein. Sensor 300 can also be manually used to enable and disable use of various network devices. For example, a user can touch sensor 324 to enable manual use of sensor 300 which can include accessing a variety of sensor enabled information that can be used to alter an operating condition of a network device. FIG. 2 and disclosure illustrates several examples of such use. Additionally, each LED can be predesigned for controlling a network device, or can be illuminated using a variety of colors to indicate which network device may be manually activated. For example, a user may want a thermostat to use a temperature sensed by sensor 300. A user may then select touch sensor 324 and the temperature read by sensor 300 may be communicated to a thermostat as the ambient temperature to be monitored. The temperature can be periodically communicated the thermostat over an energy efficient time interval to preserve battery life.

Figure 4:
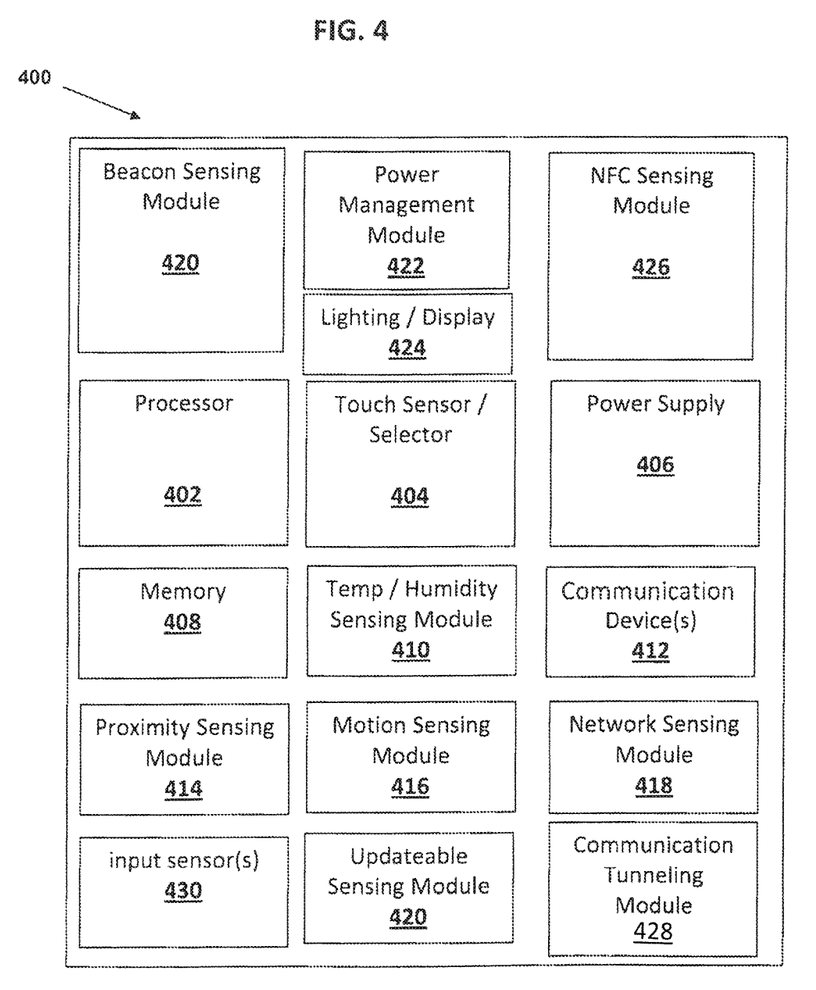
FIG. 4 illustrates a block diagram of an intelligent remote sensor apparatus according to an aspect of the disclosure.

FIG. 4 illustrates a block diagram of an intelligent remote sensor apparatus according to an aspect of the disclosure. An intelligent remote sensor, illustrated generally as sensor 400, can include a processor 402, one or more touch sensors/selectors 404, a poser supply 406 such as one or more batteries, solar chargers, rechargeable batteries, having various different battery types, a memory 408 that can be provided internal or external to processor 402 and can include non-volatile and in some instance additional volatile memory. Sensor 400 can also include a temperature and humidity module 410, a communication device(s) 412 having one or more type of wireless and wire-line communication devices as described herein, and a proximity sensing module 414, a motion sensing module 416, and a network sensing module 418. Sensor 400 can also include an updateable sensing module 420 configured to be used by processor 402 to allow for updates for modules and firmware to be provided and in some forms, additional modules can be added to sensor 400 and used as needed. Sensor 400 also includes a communication tunneling module 428 capable of establishing a communication tunnel between sensor 400 and an external communication device deployed by a another device or sensor. Communication tunneling module 428 can be used to create a communication tunnel between sensor 400 and another communication device or module (not expressly illustrated) to allow for a transfer of information. For example, sensor 400 can include a Zigbee communication device, a Z-Wave communication device, and a Bluetooth communication device. Sensor 400 can receive Zigbee configured information and communicate the Zigbee information using communication tunneling module over a Bluetooth network to a mobile device using a communication tunnel established between sensor 200 and a mobile device, network device and the like. The established tunnel can also be used to communicate Z-Wave information using the same tunnel. As such, the amount of processing capabilities and memory needed to be deployed by sensor 400 can be significantly reduced through the use of at least communication tunneling module 428 leading to reduced cost, translation, and processing needed to convert various communications other formats.

According to an aspect, various types of sensor based information can be used with sensor 400. For example, sensor based information can include information from temperature sensing, humidity sensing, network availability sensing, network device sensing, connected network device sensing, power management sending, proximity sensing, distance sensing, motion sensing, sound sensing, light sensing, airflow sensing, face recognition sensing, thumb or finger I.D. sensing, or various other types of sensing and combinations thereof.

During use, sensor 400 can be used to communicate information to an environment coordinator deployed by a remote device such as a network device. According to an aspect, communication device(s) 412 can be configured to communicate with a mobile device and an environment coordinator located at a site such as illustrated by example in FIG. 2 above. Sensor 400 can utilize touch sensor 404 to enable an operating condition of a network device. Processor 402 can process the selection of touch sensor/selector 404 to determine an operating condition selected, network device selected, an operating mode or state of a network device, sensor 400 and the like. For example, processor 402 can initiate altering a setting of a network device within an environment. Processor 402 can also detect if a mobile device may be connected to a communication device 412 and can initiate communicating setting information to the mobile device to alter an operating condition of the network device. An event coordinator, located on the mobile device or a network device and then be used to determine if an operating condition should be altered. For example, settings information can be communicated from sensor 400 to a mobile device, and mobile device may be able to communicate directly with the selected network device to alter the operating condition. In other forms, the mobile device may be able to communicate the setting information to a network device cable of communicating with the selected network device to be altered. Messaging generated by sensor 400 and processor 402 can then communicate through a mobile to a network device having an environment coordinator. In this manner, various types of communication can be deployed to enable activation of a setting.

According to another aspect, According to a further aspect, memory 408 can include any combination of ROM, PROM, EPROM, EEPROM, Flash, or various other types of storage mediums including solid state, optical drives, HDD, or any combination thereof.

According to a further aspect, memory 408 can store setting information, sensory based information, modules, software, firmware, or various other types of information that can be used by processor 402. In other forms, portions or all of a module can be stored within a another electronic device that can be access by processor 402. In this manner, a component or device can provide sensory based information directly to processor 402 or in other forms processor 402 can operate a module as software or firmware using memory 408.

According to an aspect, processor 402 can include an ARM based processor, and in some forms can include Freescale® i.MX-based processor, Kinetis processor, an Intel Atom® processor, or a small form factor processor that may be integrated into another component such as a wireless module have processing capabilities. Various other types of processors can me used. Processor 402 can also include an operating system, such as Linux, that can be executed by processor 402, and in one aspect, can include a Java environment to process Java code and applications. Other software environments, included embedded software can also be supported in stead of, or in addition to, as needed or desired.

In other forms, lighting and display 424 can include various types of display technologies can be used having single color, multicolor, or any combination thereof, including, but not limited to LED displays, TFT displays, OLED displays, LCD displays, flexible lighting displays, flexible LED displays, thin film over LED, a pico projector, or any combination thereof. Touch sensor/selector 404 can include various types and combinations of touch technologies can also be used including, but not limited to, resistive touch sensors, capacitive touch sensors, motion detecting sensors, infrared sensors, heat sensors, or various other types of sensors that can be used to detect an input from a user.

According to a further aspect, communication device(s) 412 can be configured to use any combination of hardware, software, or firmware, and can include any combination or portion of a serial bus interface, a network bus interface, a parallel bus interface, a serial-parallel bus interface, a universal serial bus interface, industry standard bus interface, controller area network bus interface, a serial peripheral interface, an HDMI interface, a universal asynchronous receiver transmitter interface, a control bus interface, standard digital input output interface, a proprietary bus interface, or any combination thereof. Additionally, communication module 418 can also include an information network interface, a network device identifier and profile information of module, wireless energy network message information, network protocol configuration data, or any combination thereof. Further, communication tunneling module 428 can include portions or all of the configuration of communication device(s) 412 and an embodiment can be integrated as a part of communication devices (412).

According to an aspect, sensor 400 can be configured to include one or more communication device(s) 412 in module or chip form including, but not limited to, power-line communication, wire-line communication, wireless communication, Zigbee based communication, INSETEON based communication, X10 based communication, Z-Wave based communication, WiMAX based communication, Bluetooth-based communication, Bluetooth LE based communication, iBeacon communication, WIFI based communication, 802.11-based communication, 802.15-based communication, 802.16-based communication, proprietary communication, other communications described herein, or any combination thereof.

According to an aspect, sensor 400 can also include an expansion slot (not expressly illustrated) such as a network interface card (NIC), Ethernet port, one or more USB interfaces or mini-USB interfaces, an SDIO slot, additional data or plug interfaces, Zigbee and Z-wave slot interfaces, or any combination thereof to increase memory capacity or other functionality that be added to sensor 400.

According to a further aspect, sensor 400 can include use various other smart energy protocols configured to communicate using a smart energy protocol and one or more communication devices. According to an aspect, sensor 400 can incorporate Smart Energy Profile (SEP) version 2.0, herein incorporated by reference, or various other updates to SEP 2.0, and in some forms, previous versions of SEP can also co-exist with SEP 2.0 or later versions. For example, sensor 400 can receive information formatted to various versions of SEP standards and processed accordingly. As such, sensor 300 can be used to comply with Zigbee standards including, but not limited to, building automation, remote control, smart energy, health care, home automation, telecom services, network devices, gateways, wearables or any combination thereof. According to an aspect, various other types of profiles or protocols can be used by sensor 400 and can be updated to add, delete, and modify as needed and can include any combination of a Smart Energy based profile, a Echonet Lite based profile, a Echonet based profile, a UPNP based profile, a DLNA based profile, a environment management based profile, a customer engagement based profile, an AirPlay based profile, a user profile, a device profile, a system profile, a source profile, customer profile, a site profile, custom or proprietary profile, or any combination thereof stored within memory 408. According to an aspect, a profile can include only protocol information specific to a network device as well to limit the amount of memory 408 needed by sensor 400.

According to a further aspect, communication device(s) 412 can be used in one or more different operating modes including, but not limited to, a bridge, an access point, a router, a network, an end point, a mesh network, a star network or various other types of network topologies and configurations and needed or desired.

According to a further aspect, sensor 400 can include one or more input sensor(s) 430 capable of providing inputs and used by sensor 400 and modules. For example, inputs sensor(s) 430 can include temperature sensors, humidity sensors, light sensors, motion sensors, IR sensors, cameras or optical sensors, kinetic sensors, power sensing devices including electronic sensors, including, but not limited to, current sensors, voltage sensors, impedance sensors, microphones, or any combination thereof. Other sensors can also include combinations of network bandwidth sensors, wireless signal sensors, bit-rate sensors communicating data, audio sensors, or various other types of input sensors that can be used by sensor 400.

According to a further aspect, sensor 400 can also include a near field communication (NFC) sensing module 426 that can be provided as a reader, a passive device or tag, or a combination thereof. For example, sensor 400 can use NFC sensing module 426 to add or provision additional network devices that can be access and managed by sensor 400. As such, a new network device can be placed in close proximity to sensor 400. Provisioning information of the additional resource can then be used as needed. For example, provisioning information can include communication profile information, device identifiers, or various other types of information that can be used to provision the network device.

According to a further aspect, NFC sensing module 426 can be scanned by a third party NFC reader interested in sensor 400. For example, model information, website information, mobile application, advertisement information, pricing information, supported communications, website reviews or links to reviews capable of providing reviews about sensor 400, or any combination thereof.

According to another aspect, sensor 400 can access information, such as a network device profile and use the network device profile to output a message receivable by a specific network device. For example, network device data can be formatted using a network device profile of a specific network type of the wireless energy network. In some forms, a network device profile may not include information sufficient to output network device data.

As such, profile modifiers can be provided and can include profile modification data of the resource. Sensor 400 can be used to access, create and manage operating conditions, home profiles, user profiles, device profiles, user schedules, proximity detection, demand response preferences, energy savings preferences, other control settings, or any combination thereof. Other settings and operating conditions can be accessed, monitored, or managed as needed or desired.

In other forms, provisioning of sensor 400 can include enabling sensor 400 to have access to one or more types of networks. For example, a sensor 400 may include a Z-Wave communication device. As such, an NFC sensing module 426 can include a Z-Wave profile information, and credentials to enable a network device to be used at a site. In other forms, a combination of communication devices may be provided within sensor 400. As such, an NFC sensing module 426 or an NFC device can include credentials for multiple communication devices and may communicate information to enable management or use of sensor 400.

According to a further aspect, communication device(s) 412 can also include using channel I.D.'s, PAN I.D.'s, Device I.D.'s, an can further include providing a location of a network device, a group of network devices, a device type, security information, a network key, device profile information including information sufficient to enable communication between a network device and sensor 400.

Note that not all of the activities described above in the general description or the examples are required, that a portion of a specific activity may not be required, and that one or more further activities may be performed in addition to those described. Still further, the order in which activities are listed are not necessarily the order in which they are performed.

The specification and illustrations of the embodiments described herein are intended to provide a general understanding of the structure of the various embodiments. The specification and illustrations are not intended to serve as an exhaustive and comprehensive description of all of the elements and features of apparatus and systems that use the structures or methods described herein. Many other embodiments may be apparent to those of skill in the art upon reviewing the disclosure. Other embodiments may be used and derived from the disclosure, such that a structural substitution, logical substitution, or another change may be made without departing from the scope of the disclosure. Accordingly, the disclosure is to be regarded as illustrative rather than restrictive.

Certain features are, for clarity, described herein in the context of separate embodiments, may also be provided in combination in a single embodiment. Conversely, various features that are, for brevity, described in the context of a single embodiment, may also be provided separately or in any sub combination. Further, reference to values stated in ranges includes each and every value within that range.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

If terms used herein, including the specification or claims, are not expressly worded in means-plus-function format such as through the use of the terms "means", it is the express intent of the inventor(s) that such terms are not to be governed by 35 U.S.C. 112(6).

Although only a few exemplary embodiments have been described in detail above, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. An intelligent remote sensor enabled apparatus comprising:
a wireless communication device configured to communicate with a mobile device and an environment coordinating device located at a site, and a network connected device located at the site, the network connected device accessible and manageable by the intelligent remote sensor enabled apparatus;
an operating condition selector configured to enable a manual selection of an operating condition of the network connected device located at the site;
a processor configured to:
process a selection of the operating condition selector to enable activation of a setting of the network connected device,
detect a connection of the mobile device to the wireless communication device, and
initiate communication of setting information to the environment coordinating device to alter the operating condition of the network connected device; a memory configured to store the setting information usable by the processor;
a sensor device configured to sense at least one operating condition of an environment at the site; and
a near field communication (NFC) device configured to:
output authentication data to the mobile device to join the mobile device when the mobile device is placed near the NFC device,
add another network connected device to be located at the site upon the another network connected device being placed near the NFC device, the another network connected device accessible and manageable by the intelligent remote sensor enabled apparatus, and
output sensed information including a status information of the at least one operating condition of the environment at the site.

2. The apparatus of claim 1 further comprising the sensor device configured to provide one or more of the following:
temperature sensing,
humidity sensing,
network availability sensing,
connected device sensing,
power management sensing,
proximity sensing,
network device sensing,
distance sensing,
motion sensing,
sound sensing,
light sensing, and
airflow sensing.

3. The apparatus of claim 1 wherein the network connected device includes the environment coordinating device.

4. The apparatus of claim 1 further comprising a proximity sensing device configured to alter transmission of a wireless communication of the communication device based on a presence or an absence of a user.

5. The apparatus of claim 1 further comprising a proximity sensing device configured to alter a sleep state and an awake state based on a proximity based input and a time interval.

6. The apparatus of claim 5 wherein the processor is configured to use one or more of:
a Bluetooth LE device to transmit sensory-based information when in an awake state, and
a power management device configured to initiate a reduction in power consumption when a user is away or home by altering an operating mode of the Bluetooth LE device,
wherein the time interval includes a variable time interval to initiate the wakeup and sleep states.

7. The apparatus of claim 1 wherein the processor is further configured to initiate communication with an iOS-based operating system device using an iBeacon protocol and to initiate a communication with an Android-based operating system device using Bluetooth LE protocol upon detection of either iOS.

8. The apparatus of claim 6 further comprising the communication device configured to transmit sensory-based information formatted to be displayed on a GUI of a mobile device.

9. The apparatus of claim 1 further comprising a touch button configured to enable and disable one or more network devices including:
a lighting device,
a temperature device,
a speaker device,
a camera device,
a door lock, and
an additional network device.

10. The apparatus of claim 1 further comprising a touch button configured to lock and unlock manual, non-proximity based detection.

11. The apparatus of claim 10 further comprising the processor configured to be usable with the mobile device to activate and deactivate use of sensory-based information to alter operating the network connected device based on the mobile device connecting to the communication device.

12. The apparatus of claim 10 wherein the touch button is configured to initiate the processor to group the network connected devices and to enable and disable use when activated or deactivated by the touch button.

13. The apparatus of claim 1 further comprising:
a material covering a portion of a housing; and
wherein the wireless communication device communicates information identifying a color of the material, the information receivable by the mobile device to display the color on a display of the mobile device.

* * * * *